(12) United States Patent
Gräber et al.

(10) Patent No.: US 9,541,124 B2
(45) Date of Patent: Jan. 10, 2017

(54) BALL JOINT

(71) Applicant: ZF Friedrichshafen AG, Friedrichshafen (DE)

(72) Inventors: Jürgen Gräber, Stemwede (DE); Rainer Ungruh, Hoerstel (DE); Cord Fricke, Dickel (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/654,859

(22) PCT Filed: Dec. 16, 2013

(86) PCT No.: PCT/EP2013/076757
§ 371 (c)(1),
(2) Date: Jun. 23, 2015

(87) PCT Pub. No.: WO2014/111215
PCT Pub. Date: Jul. 24, 2014

(65) Prior Publication Data
US 2015/0337892 A1 Nov. 26, 2015

(30) Foreign Application Priority Data

Jan. 15, 2013 (DE) .................. 10 2013 200 510
Jan. 16, 2013 (DE) .................. 10 2013 200 586

(51) Int. Cl.
*F16C 11/06* (2006.01)
*F16C 11/08* (2006.01)

(52) U.S. Cl.
CPC ........ *F16C 11/0652* (2013.01); *F16C 11/0638* (2013.01); *F16C 11/0647* (2013.01);
(Continued)

(58) Field of Classification Search
CPC ..... B60G 7/005; B60G 2204/416; B62D 7/16; B62D 7/163; B62D 7/166; F16C 11/0619; F16C 11/0623; F16C 11/0628; F16C 11/0633; F16C 11/0638; F16C 11/0642; F16C 11/0647; F16C 11/0652; F16C 11/0657; F16C 11/0685; F16C 11/08; F16C 11/083; F16C 11/086; Y10T 403/32631; Y10T 403/32688; Y10T 403/32713; Y10T 403/32721; Y10T 403/32737; Y10T 403/32754; Y10T 403/32786; Y10T 403/32811
(Continued)

(56) References Cited

U.S. PATENT DOCUMENTS 5,509,748 A 4/1996 Idosako et al.
6,042,293 A 3/2000 Maughan
(Continued)

FOREIGN PATENT DOCUMENTS

DE 24 41 916 A1 3/1976
DE 38 23 755 A1 1/1989
(Continued)

OTHER PUBLICATIONS

German Search Report Corresponding to 10 2013 200 586.5 mailed Dec. 4, 2013.
(Continued)

*Primary Examiner* — Josh Skroupa
(74) *Attorney, Agent, or Firm* — Davis & Bujold, PLLC; Michael J. Bujold

(57) ABSTRACT

A ball joint, in particular, an axial joint, having a ball stud, which is enclosed in a ball socket. The ball socket is enclosed in a joint housing and is integrally formed having at least one spring element in a region of the ball socket that faces away from the opening of the joint housing. The spring (Continued)

element has discontinuities, in particular in the form of slots, so that wear compensation is created by the spring element within the ball joint.

10 Claims, 1 Drawing Sheet

(52) U.S. Cl.
CPC ......... *F16C 11/086* (2013.01); *F16C 11/0685* (2013.01); *Y10T 403/32713* (2015.01); *Y10T 403/32737* (2015.01); *Y10T 403/32811* (2015.01)

(58) Field of Classification Search
USPC ........ 403/122, 129, 132, 133, 135, 137, 141
See application file for complete search history.

(56) References Cited

U.S. PATENT DOCUMENTS

| | | | |
|---|---|---|---|
| 6,554,525 | B1 | 4/2003 | Heidemann et al. |
| 7,056,125 | B2 | 6/2006 | Melis et al. |
| 7,153,055 | B1 | 12/2006 | Dorr |

FOREIGN PATENT DOCUMENTS

| | | |
|---|---|---|
| DE | 694 07 894 T2 | 9/1998 |
| DE | 199 14 452 A1 | 10/1999 |
| DE | 198 41 410 C1 | 7/2000 |
| DE | 199 30 445 A1 | 1/2001 |
| DE | 60 2004 003 093 T2 | 4/2007 |
| EP | 0 343 881 A1 | 11/1989 |
| EP | 0 403 107 A1 | 12/1990 |
| EP | 0442602 A1 * 8/1991 .......... F16C 11/0638 |
| EP | 0 675 296 A1 | 10/1995 |
| EP | 0 846 611 A2 | 6/1998 |
| EP | 0 916 859 A2 | 5/1999 |
| GB | 2 212 211 A | 7/1989 |
| JP | 2006-292094 A | 10/2006 |
| JP | 2012-189146 A | 10/2012 |

OTHER PUBLICATIONS

International Search Report Corresponding to PCT/EP2013/076757 mailed Mar. 7, 2014.

* cited by examiner

BALL JOINT

This application is a National Stage completion of PCT/EP2013/076757 filed Dec. 16, 2013, which claims priority from German patent application serial no. 10 2013 200 586.5 filed Jan. 16, 2013 and German patent application serial no. 10 2013 200 510.5 filed Jan. 15, 2013.

FIELD OF THE INVENTION

The invention relates to a ball joint, in particular, an axial joint, a ball socket as well as a method of manufacturing the ball socket.

BACKGROUND OF THE INVENTION

Ball joints are frequently used in the prior art in motor vehicles, where the joints are exposed to high loads. Axial and radial joints are known in this connection. As is known, the designation of radial or axial joint refers to the main direction of stress of the ball joint in question. Thus, axial joints are primarily subjected to tensile and/or compressive loads parallel to the longitudinal axis thereof. Radial joints, on the other hand, are primarily subjected to loads transverse to the longitudinal axis thereof.

In the case of high temperatures within the ball joint, which, in the case of axial joints, for example, are caused by a direct coupling to a steering system that is hot from operation, the ball socket expands, which results in an unwanted increase in the torque within the ball joint. In order to overcome the disadvantages of thermal expansion, known ball sockets are provided with specially arranged slots. Furthermore, the ball socket may have different material thicknesses.

Continuously slotted ball sockets that are known from the prior art, for example such as a snap-fit socket, are unsuitable due to the increased tendency of such sockets to creep, as well as to have a reduced support surface, since, due to the slots, the ball socket does not rest against the housing with the entire surface thereof, and thus it is possible for the material to creep into the open space between the slots. The material thickness or, respectively, the thickness of the ball socket decreases, however, as a result of the creeping, which leads to play in the ball joint.

In particular in the case of an axial joint, the slots in the region of the opening in the housing are disadvantageous, since high loads occur, caused by tensile forces in the direction of the opening in the housing. In addition, due to the necessary deflection angle of the stud, the opening of the joint housing must be relatively large. As a result, only a small contact area is available between the ball, the ball socket and the joint housing for transferring the tensile forces. Decisive for the contact area is the area in which the ball and inner wall of the housing overlap.

In order to compensate for wear and to minimize the play within the ball joint, it is known from the prior art that ball joints may be designed having a separate elastic adjustment element such as a rubber ring, for example. DE69407894 T2 discloses an axial joint, in which an adjustment element is formed in a lower, elastic region of the ball socket, which is facing away from the ball stud or, respectively, the opening in the housing.

SUMMARY OF THE INVENTION

For this reason, the object of the present invention is to provide a ball joint or, respectively, a ball socket, which counteracts the above-mentioned disadvantages, and which better ensures that the ball socket has a high thermal and mechanical load capacity. The improvement of the ball joint should be ensured in a structurally simple manner, and thus, the ball joints should be cost-effective to produce.

This object is achieved by a ball joint and a ball socket having the features discussed below, as well as a method of manufacturing a ball socket having the features discussed below.

A ball joint, in particular, an axial joint, having a ball stud, which is enclosed in a ball socket, is provided, wherein the ball socket, with the ball stud, is enclosed in a joint housing. The ball socket is integrally formed having at least one spring element in a lower region of the ball socket, which is facing away from the ball stud or, respectively, the opening in the housing. In other words, the spring element is integrated into the ball socket. This region may also be referred to as a housing base or as housing-side. The spring element, which is integrated into the ball socket, at least partially has discontinuities, at least in part, so that play and/or wear within the ball joint can be prevented by the spring element. Over the service life or, respectively, lifespan of a ball joint, wear may occur as a result of friction or thermally induced creep of the material of the ball socket within the ball joint, for example, if the ball joint is used to connect at least two chassis components in the chassis of a motor vehicle. The wear may make itself felt through noises as a result of play within the ball joint and may lead to impermissible degree of play in the steering. In extreme cases, the component will malfunction and fail to perform its function.

In addition, by integrating the spring element into the ball socket, a very compact design can be achieved. There is no need for additional components, for example adjustment elements such as rubber rings, springs (Belleville washers) etc. that are separate from the ball socket, which components would otherwise be used between the housing and ball socket. When the spring element is interrupted in part, in particular due to slots, the discontinuity may extend over the entire spring element, or may also extend over parts thereof. The spring characteristic of the spring element can be adjusted through the shaping and length of the discontinuities (slots) in the housing-side ball socket. The spring characteristic of the spring element may also be influenced by the material thickness of the spring element.

Due to the simple design, which, nevertheless, still consistently has the necessary stability, the manufacturing costs are significantly reduced because the ball socket can be produced in a single manufacturing step (e.g. by injection molding). Overall, a joint assembly is provided, which increases the load capacity, prevents joint play even after or, respectively, as a result of wear, and which achieves consistent frictional torques in the operative temperature range, while at the same time achieving a compact design and low costs.

There are special requirements in the traction and compression direction, especially for axial joints. In the traction direction, which is to say, in the direction of the opening in the housing, due to the necessary deflection angle of the stud, only a small available contact area is available between the ball, the ball socket and the joint housing for transferring the tensile forces, because the joint opening must be relatively large. The contact area ratio of the ball socket is much lower in the region of the opening than in the opposite compression direction, because the ball socket has a substantially larger surface contact with the joint housing in the region of the base of the joint housing, thus on the side opposite the opening in the housing. As a result, the ball socket has a substantially greater contact area ratio than in the region of the opening in the housing. In other words, the ball socket can only take weight where there is an overlap of the surfaces of the ball socket with the housing or, respectively, with the joint ball.

The large deflection angle in an axial joint, in conjunction with the external axial forces, results in high normal forces between the ball, the ball socket and the inside of the joint housing. The load in the traction direction must therefore be examined especially critically, bearing wear in mind. For this reason, in as far as is possible, all of the available surface area must be used as a contact area in the traction direction. Ball sockets with discontinuities in the form of lubrication grooves or slots are therefore not suitable. For this reason, deforming sockets may be used, which, in contrast to snap-fit sockets, have none of the above-mentioned discontinuities, in particular at least in the region of the opening of the joint housing.

When the ball socket is designed as a snap-fit socket, the socket already has a spherical inner contour before assembly with the ball joint, in contrast to deforming sockets. In addition, the snap-fit sockets have slots, which extend in an axial direction, in particular in the region of the opening in the housing, in order to make it possible to snap in the ball socket during assembly. This is associated with the disadvantage, however, that the load capacity of the ball socket, and thus of the entire ball joint, is reduced, since the ball socket does not act on or, respectively, support the ball, in the region of the slots.

A deforming socket is cup-shaped prior to assembly, and has a cylindrical opening, in particular in the region of the opening in the housing. It is only when the ball joint is closed during the assembly that the cylindrical ball socket is deformed, in particular on the side of the opening in the housing, and adapts to the ball. It is only if the ball socket is designed as a deforming socket, and in particular, as compared to the snap-fit socket, has no slots, that it becomes possible to readjust the ball socket using the above-mentioned means, for example a rubber ring. In addition, a deforming socket is usually manufactured out of plastic, which is problematic, in particular in the case of large temperature fluctuations, for example in a range of −40° C. through +100° C., since the plastic of the ball socket expands more than the components formed out of steel, for example, such as the joint ball or the ball head of the ball stud, which is disposed in the ball socket. When the plastic expands as a result of heating, and there are no slots present, this results in an increased build-up of tension and an increase in the frictional torques, which create a further build-up of tension. Both effects result in a reduction in the load capacity.

A further requirement is generally placed on ball joints by the fact that joints are operated at low and high temperatures. As a result of the contraction in the case of slotted ball sockets, a gap is created at low temperatures and there is unacceptable play. At high temperatures, which may arise when axial joints are coupled directly to a steering system, the ball socket expands, which leads to very high, undesirable torques in the ball joint. In addition, high temperatures in the ball socket may also lead to creep processes so that, after cooling, there may be additional, undesirable play. This can be reduced if the ball socket can expand and adapt as a result of existing slots. The slots may not be located in the highly stressed regions in the vicinity of the opening in the housing, however, but instead, must be relocated to the more resilient area disposed in opposition thereto, in the vicinity of the housing base.

According to a refinement of the invention, the at least one spring element has a first region, and second region connected thereto. In particular, the second region adjoins the first region such that the second region is parallel to the longitudinal axis of the joint housing, thus adjoins it axially or, respectively, in an axial direction. The first region adjoins, in particular, a central region. Starting from the opening of the joint housing, a single-piece or, respectively, integral ball socket follows the course between the ball and the housing to a central region of the housing. The middle region is disposed such that it is transverse to the longitudinal axis. This central region is intersected by a plane, which is perpendicular to the longitudinal axis and which passes through the center of the ball. Furthermore, from the central region, the ball socket extends approximately up to the pole of the sphere, if the ball stud is not deflected, and the longitudinal axis of the ball stud and of the housing thus extend parallel to one another. The pole of the sphere, is located where the longitudinal axis of the stud essentially leaves the ball. The second region of the ball socket adjoins the first region, and extends to the end of the ball socket in the region of the pole of the ball.

In view of the above-mentioned problem, of a temperature increase within the ball joint and the expansion of the ball socket associated therewith, according to a further embodiment, the ball socket has at least one discontinuity, in particular, a plurality of discontinuities in at least one of the regions (first or second region). The discontinuity is created, in particular, by slots, which extend in an axial direction, thus approximately parallel to the longitudinal axis of the housing. The contribution of these discontinuities is that, when the ball socket expands due to an increase in temperature, which is caused, for example, by increased friction as a result of an increased load, the frictional torque within the ball joint is not exceeded to an impermissible degree. Increased wear or, in extreme cases, jamming of the ball joint is thus effectively prevented.

According to a further embodiment, the ball socket is designed as a deforming socket, wherein no lubrication grooves or, respectively, slots are formed on the ball socket in the region near the opening in the housing or, respectively, in the region of the ball stud. The deforming socket design provides an overall large supporting surface, and thus is able to withstand a greater tensile load in the direction of the opening in the housing. In addition, the design of the ball socket as a deforming socket is associated with lower manufacturing costs as compared to snap-fit sockets.

According to a further advantageous embodiment of the invention, the first region has a greater material thickness as compared to the remaining regions of the ball socket. In particular, the material thickness in the second region is lower than in the first region. As an alternative to the term 'material thickness', the term 'wall thickness' is also used. Viewed in section, a ball socket has a specific thickness or, respectively, wall thickness or even material thickness, in each region.

The support of the ball in the joint housing by means of the ball socket comprises two partial regions having different spring element designs or, respectively, spring elements having a different spring stiffness. In the first region, when the ball joint is subjected to loads, the ball socket acts as a stiff spring element through the compression of the first region having a comparatively greater wall thickness. Greater forces can be absorbed there, however only very small deformations and thus adjustment displacements are possible. As compared to the first region, in the second region there is a spring subjected to bending, which second section, in particular, provides a lesser wall thickness. Thus, in the second region, this results in a soft spring element, which has a reset spring with a low spring rate or, respectively, spring stiffness, which has a significant degree of spring travel, however which has a low degree of force. In the present case, the ball socket provides a solution having both a stiff spring element and high spring rate, and a soft adjustment element, in order to make it possible, on the one hand, to readjust the ball joint after thermal expansion, thus after cooling to a normal working temperature, and on the other hand, to enable compensation for play in the case of wear in the ball joint in a large range of demands. Using this geometric design, the ball socket meets the various demands placed thereon without requiring the use of a separate adjustment element.

According to a further, preferred embodiment, the ball socket has a wall thickness with an increasing material thickness, starting from the opening of the joint housing to the first region facing away from the opening of the joint housing, in particular, starting from the center of the joint housing to the first region. As a result, a particularly good stress distribution is achieved, i.e., uniform surface pressures when under load. In particular, due to a wedge effect that is hereby achieved in the case of thermal expansion of the ball socket in an axial direction, the combination of the increased wall thickness with the provision of the slots in the lower region provides uniform pretensioning in the case of a temperature increase, which counteracts an impermissible build-up of tension. Uniform pretensioning is thereby equivalent to constant frictional torque, preferably in the same temperature range, within the ball joint. Associated therewith is protection against excessively high tension at high temperatures, with subsequent deformation as a result of creep in the material of the ball socket.

According to a further preferred embodiment, a plurality of slots, in particular three slots, are provided. Alternatively, the number of slots may be 2, 4 or 6, in particular 5, depending on the requirements.

According to a further advantageous embodiment, the at least one spring element in the first and/or in the second region is wedge-shaped. Viewed in the sectional view, the wedge shape results from an increase or decrease in the material thickness. In particular, in the case of softer spring elements in the second region, the material thickness decreases substantially starting from or, respectively, at the junction to the first region, in order to have the correspondingly significantly reduced spring rate as compared to the first region. The spring element is subjected to bending in this second, lower region. In a variant, it is also conceivable that the second region is not subjected to bending or, respectively, the second region can thereby essentially be regarded as non-existent.

The ball socket may be made of or, respectively, be manufactured out of plastic (e.g. polyoxymethylene, polyamide, PEEK (polyetheretherketone), polyphenylene sulfide, polyphthalamide).

The production of the ball socket can preferably be done in a single manufacturing step through injection molding or, respectively, through extrusion. As such, a replaceable insert may be provided inside the tool in order to be able to vary the number of slots in a simple manner.

The joint housing is preferably designed as a cold extruded part without mechanical, that is, milling processes, which significantly reduces manufacturing costs. The joint is closed in a simple manner, by deformation, in particular by cold shaping the cylindrical edge region of the housing in the direction of the ball stud.

BRIEF DESCRIPTION OF THE DRAWINGS

In the following, embodiments of the invention are described in greater detail with reference to the drawings. Shown are.

DETAILED DESCRIPTION OF THE PREFERRED EMBODIMENTS

Figure 1:
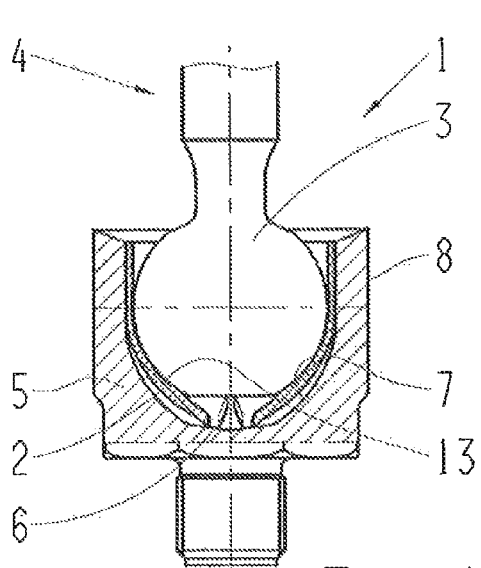
FIG. 1 a joint assembly according to an embodiment of the invention, in a pre-assembled state.

FIG. 1 shows a sectional view of a ball joint 1 according to an embodiment of the invention, designed as an axial joint, in a preassembled state. As is evident here, the ball joint comprises a ball socket 2, in which a joint ball 3 of a ball stud 4 is disposed. The ball socket 2, in turn, is enclosed in a housing 5. As such, in the pre-assembled state, the ball socket 2 is resting on the spring element 13, which will be described in greater detail in conjunction with FIGS. 4A and 4B, on the housing base 6.

Figure 2:
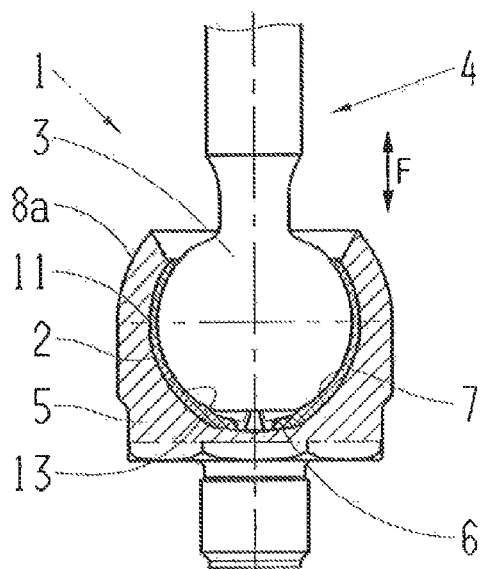
FIG. 2 the joint assembly depicted in FIG. 1 in an assembled state.

FIG. 2 again shows a sectional view of the joint assembly 1 depicted in FIG. 1, in an assembled state. As indicated here, the main direction of stress, which is indicated by the double arrow with the reference character F, extends axially, in the traction and compression direction. In the assembled state, the ball socket 2 rests completely against the supporting regions, that is, on the inner wall 7 of the housing 5 and on the joint ball. The spring element 13 (see FIGS. 4A, 4B) is thereby pretensioned, and generates pretensioning in the ball joint. The upper region 8 of the housing 5 and the ball socket 2 are deformed, in order to adapt to the outer contour of the joint ball 3 so that the ball socket 2 is enclosed by the housing 5 and fixed therein. The housing was closed by deforming the housing 5 at the edge region 8a thereof depicted above.

Figure 3:
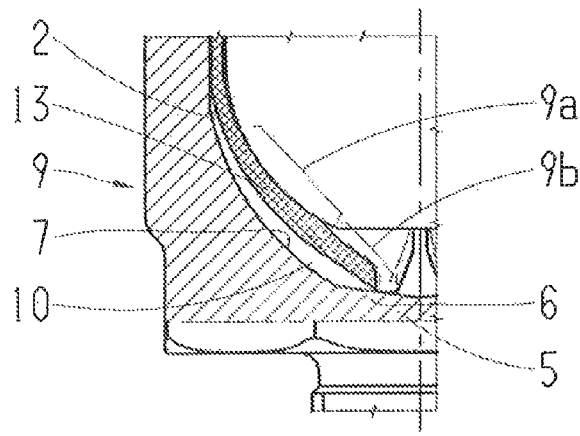
FIG. 3 a detail view of the lower region of the joint assembly depicted in FIG. 1.

FIG. 3 likewise shows a sectional view of a detail of a lower region 9 of the joint assembly 1 depicted in FIG. 1. As is evident here, the spring element 13 is present in a first region 9a and in a second region 9b. The spring element 13 is depicted with only the outer end of the second region 9b thereof resting on the housing base 6. In the pre-assembled state, there is a gap 10 located between the inner wall 7 of the housing 5 and the ball socket 2. As is evident here, the wall thickness of the ball socket 2 increases from the center of the housing, which is designated in FIG. 2 by the reference character 11, in the direction towards the housing base 6 to the start of the second region 9b, and has the greatest material thickness at the end of the first lower supporting region 14. The material thickness of the second region 9b is significantly reduced as compared to the material thickness of the first region 9a. It is evident that the material thickness of the second region 9b decreases, starting from the lower end of the first region 9a, toward the lower end thereof.

Figure 4A:
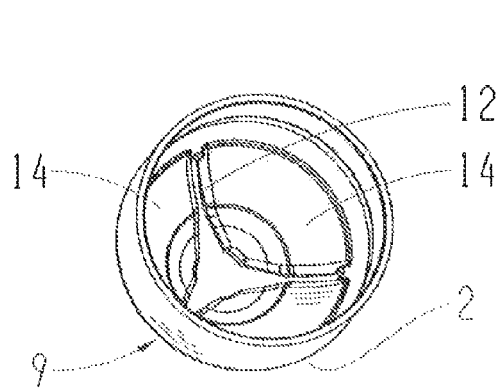
FIGS. 4A and 4B isometric views of the ball socket of the joint assembly depicted in FIG. 1.
Figure 4B:
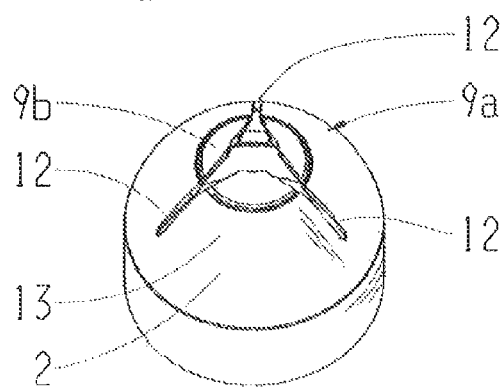

FIGS. 4A and 4B each show isometric views of the ball socket 2 without the ball stud and joint housing according to FIG. 1. FIG. 4A makes it possible to see inside the ball socket 2, where the ball is located when in an assembled state. FIG. 4B shows an outer view of the ball socket 2. As is especially evident in FIG. 4B, in the embodiment depicted here, three slots 12 are provided in the ball socket 2, which are only formed in the lower region (9a, 9b) of the ball socket 2. The spring element 13, which is integrated into the ball socket, comprises the very stiff region 9a, which operates through compression to provide for very large forces but only small amounts of travel, and the soft region 9b, which operates through deflection to provide low forces but large amounts of travel. Moreover, as is evident both here and in FIG. 1, the ball socket 2 is designed as a deforming socket.

REFERENCE CHARACTERS 1 joint assembly
2 ball socket
3 joint ball, ball head
4 ball stud
5 housing, joint housing
6 housing base
7 inner wall
8 upper region
8a upper edge region
9 lower region
9a first region
9b second region
10 gap
11 center of the ball
12 slots
13 spring element(s)
14 lower supporting region of the ball socket

The invention claimed is:

1. A ball joint (1) comprising:
a ball stud (4) having a joint ball being enclosed in a ball socket (2),
the ball socket being enclosed in a joint housing,
the ball socket (2) having at least one spring element (13) in a lower region (9) of the ball socket (2) that faces away from an opening of the joint housing, and the spring element being integrally formed with the ball socket,
the spring element (13) being designed such that, in a pre-assembled state, a gap (10) being located between an inner wall (7) of the housing (5) and an exterior surface of the spring element (13), and, in an assembled state, the spring element (13) is pretensioned to generate a pretension in the ball joint (1),
the spring element (13) at least partially having discontinuities, which are formed by slots (12), so that a compensation of at least one of play and wear, within the ball joint, is created by the spring element, and the slots extending fully through the spring element from the exterior surface thereof to an interior surface thereof facing the joint ball, and
the at least one spring element (13) having a first region (9a) and a lower second region (9b), the second region of the at least one spring element adjoins the first region at a bottom of the first region, and, when viewed in cross section, the at least one spring element (13) in the first and in the second regions (9a, 9b) is wedge-shaped, a wall thickness of the ball socket (2), in the first region (9a), increases toward the bottom of the first region up to a start of the second region (9b) and the wall thickness of the ball socket (2) decreases in the second region (9b), starting from the bottom of the first region (9a) to a bottom of the second region.

2. The ball joint (1) according to claim 1, wherein the spring element (13) has the discontinuities in at least one of the first and the second regions (9a, 9b).

3. The ball joint (1) according to claim 1, wherein the spring element has either three or five slots (12).

4. The ball joint (1) according to claim 1, wherein the first region (9a) has a greater wall thickness, as compared to remaining regions of the ball socket, so that the wall thickness in the second region (9b) is lower than the wall thickness in the first region (9a).

5. The ball joint (1) according to claim 1, wherein the ball socket (2) has a wall thickness with an increasing material thickness, starting from a center (11) of the joint housing (5), toward the first region (9a).

6. The ball joint (1) according to claim 1, wherein the ball socket (2) has a wall thickness with an increasing material thickness, starting from the opening of the joint housing, toward the first region (9a) facing away from the opening of the joint housing (9a).

7. The ball joint according to claim 1, wherein the ball socket (2) is open at a lower end thereof.

8. The ball joint according to claim 7, wherein the slots (12) widen, about a circumference of the ball socket, in a downward direction, toward the lower end of the ball socket.

9. A ball joint comprising:
a ball stud having a joint ball which is enclosed in a ball socket,
the ball socket being enclosed in a joint housing,
the ball socket and the joint housing defining an axis and having openings through which the ball stud extends when the joint ball is received within the ball socket and the joint housing,
the ball socket having at least one spring element in a lower region thereof that is axially opposite the opening of the ball socket and the joint housing, and the spring element being integrally formed with the ball socket,
in a preassembled state, a gap is located between an inner wall of the joint housing and an exterior surface of the spring element, and, in an assembled state in which an axial upper end of ball socket and the joint housing are bent radially inwardly secure the joint ball therein, the spring element is pretensioned to generate pretension in the ball joint,
the spring element having discontinuities, which are formed by slots, which create compensation for at least one of play and wear within the ball joint, the slots in the spring element spanning from the exterior surface of the spring element to an interior surface of the spring element facing the joint ball,
the spring element having an axially upper first region and an axially lower second region, at least the first region of the spring element has a convex cross section, and a bottom of the first region adjoins a top of the second region,
the spring element, in the first and in the second regions, is wedge-shaped when viewed in cross section,
the first region of the spring element of the ball socket having a cross sectional wall thickness that increases from a top of the first region to a top of the second region, and
the second region of the spring element of the ball socket having a cross sectional wall thickness that decreases from the bottom of the first region to a bottom of the second region.

10. The ball joint according to claim 9, wherein the exterior surface of the spring element, when viewed in cross section, is arcuate from the top of the first region to the bottom of the second region.

* * * * *